Patented May 24, 1927.

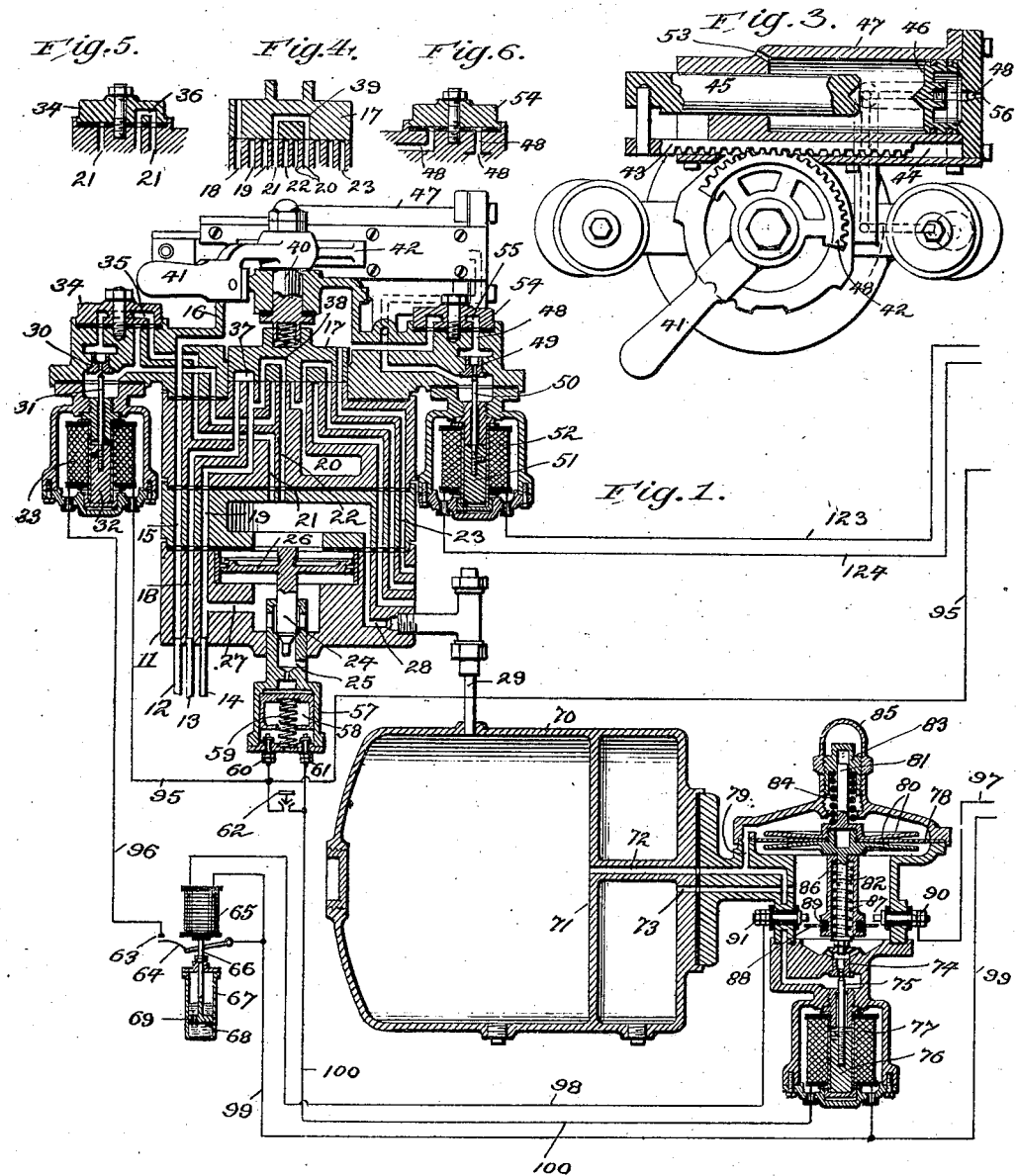

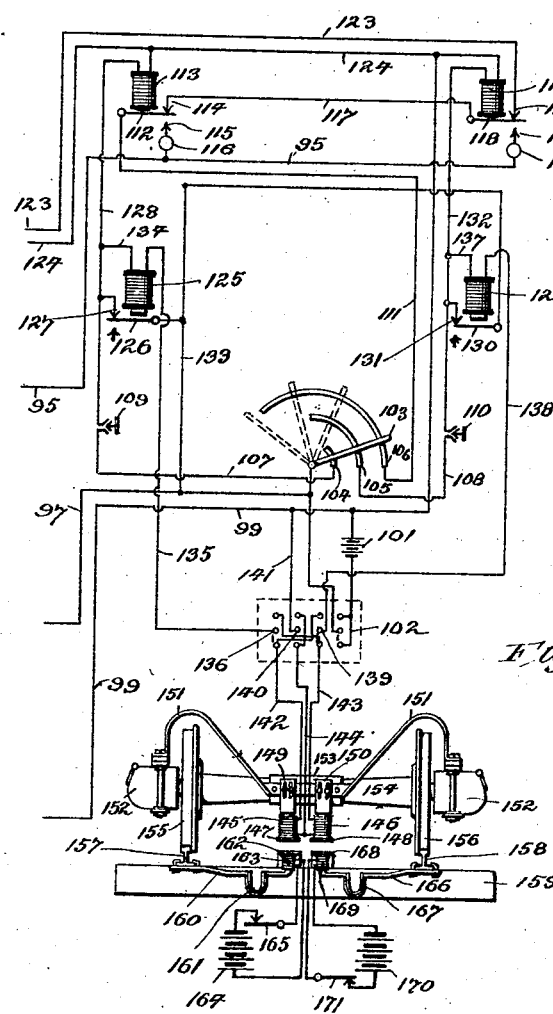

1,630,234

UNITED STATES PATENT OFFICE.

CHARLES A. CAMPBELL AND ERWIN C. VROMAN, OF WATERTOWN, NEW YORK, ASSIGNORS TO THE NEW YORK AIR BRAKE COMPANY, A CORPORATION OF NEW JERSEY.

TRAIN CONTROL.

Application filed July 31, 1926. Serial No. 126,306.

This invention relates to train control devices for use with automatic air brakes and particularly to mechanism for applying the brakes by the so-called "split reduction" method, by which the brakes are gradually applied as a result of successive small reductions of brake pipe pressure.

Generally stated, the invention resides in the combination in certain relations, of motor means for shifting the engineer's brake valve automatically to an application position, reduction limiting means which terminate the ensuing brake pipe pressure reduction, and a timing mechanism which after a chosen interval restarts the brake pipe reduction, the reduction then continuing until again terminated by the limiting means, and so on. A characteristic of the device is that during the split reduction the engineer's brake valve remains in application position instead of being moved automatically from application to lap and so on alternately, as has heretofore been proposed.

Another feature of the invention is means by which the engineer may in all cases prevent the successive reductions of brake pipe pressure after the first.

The mechanism so far described in general terms may be set into action by various known mechanisms, but develops peculiar utility in combination with an inductive impulse actuating mechanism. This includes a speed controlling mechanism operative at different speeds, on caution and danger indications, respectively, subject under certain conditions to neutralizing control by the engineer, but imposing an absolute speed limit. This inductive impulse mechanism with its speed control and neutralizing features is not broadly new but is combined in special relations with the brake valve actuating motor, the limiting mechanism, and the timing mechanism.

The preferred embodiment of the invention is illustrated, largely, in diagram in the accompanying drawings, in which—

Fig. 1 is a vertical axial section of the engineer's brake valve (in running position), equalizing reservoir, reduction limiting valve and timing relay, with the electrical connections to the inductive mechanism.

Fig. 2 is a view in elevation of the inductive mechanism with its electrical connections.

Fig. 3 is a horizontal axial section through the cylinder of the brake valve motor showing the mechanical connections to the brake valve.

Fig. 4 is a fragmentary section similar to a portion of Fig. 1 but showing the rotary valve of the engineer's brake valve in service application position.

Fig. 5 is a fragmentary view similar to a portion of Fig. 1 and showing the cut-out for the reduction terminating valve set to cut this valve out of action.

Fig. 6 is a similar fragmentary view showing the cut-out for the brake valve motor set to cut this out of action.

Figures 1 and 2, though drawn on entirely different scales, together form a complete diagram of the system in normal running condition. The engineer's brake valve is shown, according to a familiar convention, with all seat passages in a single plane to facilitate explanation of its functions.

Referring first particularly to Figures 1 and 3, the body of an ordinary engineer's brake valve is shown at 11. This valve departs from standard practice only very slightly. In the first place, it is equipped with a pressure motor, later described in detail, which may be operated to move the valve to service application position and leave it there. In the second place, the preliminary exhaust port instead of leading directly from the space above the equalizing discharge piston to the seat of the rotary valve, passes on its way through the seat of an electrically operated stop valve. This valve is used during automatic application to terminate the pressure reduction above the equalizing piston. Third, there is applied to the discharge port of the equalizing discharge valve a pressure actuated switch which responds to the discharging pressure and performs a function which will later be described more fully.

With this general statement of the structure of the valve, a brief detailed description will be given sufficient to identify those parts which enter into the function of the valve in running and in service positions and involved in any way in the action of the train control mechanism.

The main reservoir connection is shown at 12, the feed connection from the pressure reducing feed valve at 13, and the brake pipe connection at 14. The main reservoir connection 12 leads by way of the main reservoir port 15 to the space within the cap 16 above the usual rotary valve 17. Similarly, the feed connection communicates with the feed port 18 and the brake pipe connection with the brake pipe port 19, each of which ports terminates in the seat of the rotary valve 17.

There is an exhaust port 20 which has two branches, terminating on the seat of the rotary valve, a preliminary exhaust port 21 which leads from the space above the equalizing piston to the seat of the rotary valve, and an equalizing reservoir port 22. There are other ports visible in the drawing, but since they are for known purposes and not concerned with the present invention they need not be further discussed.

The usual equalizing discharge valve 24 controls a discharge port 25 and it is actuated by the equalizing discharge piston 26. The space below this piston is connected by a passage 27 with the brake pipe port 19, while the space above the piston is connected with the equalizing reservoir hereinafter described, by way of passage 28 and connection 29.

As stated, the preliminary exhaust port is controlled by a stop valve, and this valve includes a seat 30, a needle valve 31 coacting therewith, an armature 32 connected to the needle valve for actuating the same, and an electromagnetic winding 33 for actuating the armature. Normally, the winding 33 is deenergized, leaving the preliminary exhaust port open. The valve remains in this condition during all manual operations of the brake valve, but after the brake valve has been moved to service position automatically, and after a definite pressure reduction in the equalizing reservoir has occurred, the coil 33 is energized by automatic means, terminating the discharge of pressure from the equalizing reservoir. It is this winding which is excited to terminate each of the successive reductions and deenergized to initiate each successive reduction after the first.

At times, as a result of derangement of the wiring, it might be necessary to cut out the needle valve 31. Consequently, a rotary cap 34 is provided which has a port 35, through which the preliminary exhaust port 21 is normally connected (see Figure 1). This cap has another port 36 which is rendered effective by the rotation of the cap 34 to an abnormal position (see Figure 5), and when effective establishes a by-pass around the valve 31 and its seat 30. As the rotary cap 34 is merely an emergency appliance it is normally sealed in the position shown in Figure 1 to prevent unauthorized turning of the cap.

The rotary valve 17 has a feed groove 37 through which the brake pipe port 19 is fed from the feed port 18 in running position. Another passage effective in running position is the passage 38 which establishes an equalizing connection between the brake pipe port and the equalizing reservoir. In service position (see Figure 4) the passage 39 connects the preliminary exhaust port 21 with the exhaust port 20, and is the port through which the pressure in the equalizing reservoir is reduced to bring about a service reduction of brake pipe pressure.

It seems unnecessary to describe the other passages in the rotary valve as these are of usual form and have no novel function in connection with the present invention. It may be noted, however, that the valve is of the ordinary equalizing discharge type having the usual positions known as release, running, holding, lap, service, and emergency, together with the usual functions corresponding to such positions.

The rotary valve 17 is turned on its seat by means of a stem 40 which is provided with the usual handle 41. The handle 41 is provided with a sector gear 42 which meshes with a rack 43 and the rack 43 is longitudinally slidable in a guideway 44. The rack 43 is rigidly connected to a piston rod 45 which is in thrust relation with a piston 46 slidable in a cylinder 47. The parts are so dimensioned that when the piston 46 moves to its limit of motion in a left hand direction it will move the valve handle 41 to service position.

A port 48 leads from the space within the cap 16 above the rotary valve 17 past the valve seat 49, which is controlled by a needle valve 50. This valve is actuated through an armature 51 by a winding 52, the parts being so arranged that when the winding 52 is excited the valve 50 is closed against its seat. This is the normal condition of the parts. Deenergization of the winding 52 permits the valve 50 to open, whereupon main reservoir air entering the cylinder 47 through the port 48 moves the engineer's brake valve to service application position. During such motion the space in advance of the piston 46 is vented through the port 53. When the air supply is cut off the pressure to the right of the piston bleeds away through a minute port 56.

Some means must be provided to prevent the action of the piston 46 should the electrical mechanism for exciting the coil 52 become deranged. Consequently a valve is used consisting of a rotary cap 54 having a port 55. When sealed in its normal position shown in Figure 1, this port serves merely as a continuing portion of the port 48. When rotated to the abnormal position shown in Figure 6, it interrupts the port 48 and precludes the flow of pressure fluid to the cylinder 47.

Mounted below the discharge port 25 of the equalizing discharge valve 24 and in communication with said port, is a cylinder 57 in which is a piston 58 urged upward by a spring 59. Spring 59 is so chosen that it will be overpowered by the discharge pressure in the port 25, and when the spring 59 is overpowered piston 58 moves downward so that it bridges and connects the two insulated electrical contacts 60 and 61 mounted in the lower head of cylinder 57.

In order to permit similar connection to be established manually, a push button switch 62 is connected across the terminals 60 and 61, but it will be understood that the switch 62 is normally open and must be held closed manually.

The winding 33 is controlled through connections hereinafter described by means of a time switch consisting of a fixed contact 63, a resilient pivoted contactor 64, a solenoid winding 65 with movable core 66 connected to actuate the contactor, and having a retarding device consisting of a plunger 68 in a dash pot 67. The plunger 68 is provided with a through port 69, so dimensioned as to give the desired timing characteristic. A liquid is used in the dash pot as the retarding fluid. This valve is so arranged that it closes in a short period, say one or two seconds, flexing the resilient contactor 64. When the coil 65 is deenergized the opening movement is relatively slower, the purpose of the delayed opening between the contactor 64 and the contact 63 being to permit certain pressure equalizations to occur in the valve mechanism for limiting brake pipe reduction.

This mechanism is associated with a special type of equalizing reservoir which will now be described. Instead of the usual reservoir a shell 70 divided by a partition 71 into two unequal chambers is connected to connection 29. These two chambers are normally in communication through ports 72 and 73. This communication is controlled by a needle valve 75 which seats on a seat 74, the valve being electrically controlled by means of an armature 76, which is actuated by a winding 77. Normally the winding 77 is deenergized so that the valve 75 is open and the two chambers are in communication with each other. Thus the entire volume of the shell 70 serves under normal conditions i. e., (during manual operation of the engineer's brake valve) as the equalizing reservoir. The winding 77 is controlled by the switching action of the piston 58 so that while the equalizing discharge valve 24 is open, but only during an application automatically produced, the winding 77 is energized. Thus, as soon as an automatically produced application commences, the small chamber to the right of the partition 71 is isolated from the larger chamber to the left thereof, and the pressure in the larger chamber commences to fall as a result of discharge through the preliminary exhaust port. Under these conditions the space to the left of the partition 71 serves as the equalizing reservoir.

It is one of the purposes of this invention to terminate the brake pipe pressure reduction as soon as a definite reduction has been obtained, and this result is secured by the use of a loaded diaphragm subject to the opposing pressures of the two chambers to the right and to the left of the partition 71. The amount that the diaphragm is loaded determines the pressure at which the reduction limiting device acts.

The diaphragm is shown at 78, and is clamped between sections of a shell which forms a sort of extension of the shell 70. The diaphragm is subject on its lower side to pressure in the smaller or right hand chamber of the shell 70, pressure being communicated by way of the port 73. On its upper side the diaphragm is subject to the pressure in the larger or left hand chamber of the shell 70, pressure arriving by way of ports 72 and 79. The diaphragm is clamped between two thrust plates 80 which carry oppositely extending stems 81 and 82. The upper stem 81 is guided in a spring seat 83. This is threaded so as to be adjustable and thus adjust the stress on the loading spring 84 which surrounds the stem 81 and exerts a downward thrust on the diaphragm. The spring seat 83 is locked in place and sealed by a cap nut 85.

Slidably mounted on the downward extending stem 82 is a sleeve 86 which is urged upward relatively to the stem 82 by a light spring 87. The sleeve 86 carries an annular flange contact 88 which is insulated at 89 from the sleeve, and which on upward movement of the diaphragm engages two contacts 90 and 91 insulated from each other. The purpose of the spring 87 is to give a yielding contact and limit the stress exerted on the contacts 90 and 91.

The electrical connections between the various parts so far described are as follows: The wire 95 leads to contact 60 and thence to one terminal of winding 33 from the other end of which a wire 96 leads to contact 63 of the time switch.

A wire 97 leads to the contact 90 of the reduction limiting device, and another wire 98 leads from the other contact 91 of the reduction limiting device to one end of the winding 65 of the time switch. From the other terminal of the winding 65 and from the contactor 64 there leads a common return wire 99 which is also connected to one terminal of the winding 77. The other terminal of the winding 77 is connected by a wire 100 with contact 61.

Thus, assuming that the wires 95 and 97 are feed wires and the wire 99 is a common return for the apparatus fed by the wire 95, it will be seen that the piston 57 controls the excitation of the winding 77, and contact 88 controls the excitation of winding 65, which in turn controls the excitation of winding 33 through the action of contactor 64 and contact 63.

The general sequence of operations in making an automatic application of the brakes is as follows: The winding 52, which is normally energized, is deenergized. Hence valve 50 opens and remains open, and main reservoir air shifts piston 46 so that the rotary valve 17 is turned to service application position, where it remains. So long as the valve 50 remains open the valve cannot be restored to release or running position, the port 56 being very minute and insufficient to counteract the feed through the valve 50. This immediately lowers the pressure above the equalizing discharge piston 26, so that the equalizing discharge valve 24 opens and flow from the port 25 commences. Almost instantly, therefore, the piston 58 is forced down, bridging contacts 60 and 61 and exciting the winding 77. Consequently, before any substantial flow from the shell 70 has occurred, the valve 75 closes and isolates the two chambers within the drum from each other. The pressure in the left hand chamber drops gradually through the action of the preliminary exhaust port 21, while the pressure to the right of the partition 71 remains constant. A point is therefore reached when the loading spring 84 is overpowered and the contactor 88 bridges the contacts 90 and 91. Ordinarily the parts would be adjusted so that this occurs after a reduction of about eight pounds has been made.

The bridging of the contacts 90 and 91 excites the winding 65 and the contactor 64 moves upward, closing the circuit with the contact 63 in the short period of from one to two seconds. During this interval the pressure in the equalizing reservoir may have dropped a pound or so, but by the time a ten pound reduction has been made winding 33 is energized and the exhaust through the preliminary exhaust port 21 ceases. In a short time brake pipe pressure and equalizing reservoir pressure will be balanced, piston 26 will move downward, and the equalizing discharge valve 24 will close, whereupon the piston 58 will move upward, deenergizing winding 77. This causes the valve 75 to open, establishing communication between the two chambers in the shell 70, and causing the pressure in these two chambers to equalize. The approaching equalization in these two chambers allows the spring 84 to restore the diaphragm 78, interrupting the circuit between the contacts 90 and 91 and deenergizing solenoid 65. The solenoid 65 is deenergized before equalization within the shell 70 is complete, but the delayed action occasioned by the dash pot holds the circuit through contactor 64 and winding 33 closed for several seconds, a time sufficient to permit complete equalization to occur.

When the circuit is interrupted at 64 and winding 33 is as a consequence deenergized, the valve 31 again opens, once more venting the shell 70, and as a result starting a discharge through the equalizing discharge valve 24. This discharge acting on the piston 58 results in a repetition of the functions already described, so that the pressure on the equalizing discharge piston 26 is reduced by successive steps of say ten pounds each.

The engineer cannot prevent the first reduction, but he can prevent reduction subsequent to the first by closing the push switch 62 which has the effect of maintaining the winding 77 constantly energized, thus preventing equalization between the two chambers of drum 70 from occurring.

The above described mechanism can be put automatically into action by a number of train control devices. The wires 97 and 99 may be permanently connected to the opposite poles of the battery or other source of current, and there should be some automatic means to interrupt an energizing circuit for the solenoid 52 and simultaneously to supply electric energy to the wire 95. It is obviously necessary that wire 95 be inert except during automatic applications, as otherwise the automatic split reduction cycle would be imposed during manual applications of the brake.

Any system which will meet the requirements above outlined might be used, and it is obviously possible to make use of track trips, track contacts, radiant energy transmitters, inductive mechanisms, or any other known means for transferring energy from the points on the track to the passing train.

Special operative functions and advantages are, however, secured by the combination of the mechanism already described with an inductive impulse mechanism of a type which heretofore, in its general aspects at least, has been known.

Such a mechanism is shown in Figure 2 and will now be described in detail. A single battery 101 is used as the source of all the electric energy used to actuate the train-carried part of the mechanism. The wire 99 is connected to one pole and the wire 97 is connected to the other pole of the battery. The connection of the wire 97 is not direct, but is through a reversing switch 102 hereinafter referred to more in detail. The connection need not be through such a reversing switch, but it is convenient to make it so because in an intermediate position of the switch all the operative circuits are interrupted and it is desirable to interrupt the battery circuit at the same time.

The wire 97 is also connected to the contactor arm 103 of a speed responsive switch. Such switches are well known, and the illustration is diagrammatic only. The switch is so contrived that when the train is at rest contactor arm 193 is to the right and horizontal. It is then in contact with three arcuate contacts of different angular extent, namely, the danger limit contact 104, a longer caution limit contact 105, and a still longer speed limit contact 106. If the train increases its speed moving in either direction, the arm 103 swings in a counter-clockwise direction. At the maximum speed at which it is desired to permit a train to enter a block against a danger signal, the arm 103 clears the contact 104. At the limiting speed at which it is desired to permit a train to enter a block against a caution signal set against it, it overruns the end of the contact 105. At the limiting speed which it is desired to permit a train to be operated under any circumstances it overruns the end of the contact 106.

Contact 104 is connected by a wire 107 with a reset button 109 which when closed will prevent the danger relays from operating, or, if they have operated, will restore the same. Obviously the switch 109 is effective only below the danger limit, for above this limit the arm 103 clears the contact 104.

Contact 105 is connected by a wire 108 with a reset 110 similar in function but designed to reset the caution relays in operative position provided the train speed is below the caution limit.

The contact 106 is a part of the main actuating circuits. Thus, when the arm 103 overruns the contact 106, brake application inevitably follows.

Remembering that arm 103 is connected to wire 97, which leads to one pole of the battery, the circuit can be traced through contact 106, wire 111, to armature 112 of what is called the secondary danger relay, whose winding is shown at 113. The armature 112 acts as a switch by moving into contact alternatively with an upper contact 114 and a lower contact 115. The lower contact 115 is connected through a danger signal lamp 116 with wire 95, already described. The upper contact 114 is connected by a wire 117 with an armature 118 of what is known as a secondary caution relay whose winding is shown at 119. The armature 118 acts as a switch by contact alternately with an upper contact 120 and a lower contact 121. The lower contact 121 is connected through a caution signal lamp 122 with wire 95. The upper contact 120 is connected by a wire 123 with the winding 52 from which winding there is a return wire 124 connected to one terminal of each of the windings 113 and 119, and also to the second pole of the battery 101, i. e., the opposite one from which the wire 97 leads.

Under normal operating conditions the armatures 112 and 118 are in their upper positions, energizing the winding 52, and deenergizing the wire 95. If either armature drops it deenergizes the winding 52 and immediately energizes the wire 95, lighting the appropriate signal lamp to indicate that the engineer has passed a danger signal or a caution signal set against him, as the case may be.

Each of the windings 113 and 119 is controlled as to excitation by a corresponding primary relay. The primary danger relay includes a winding 125, combined switch and armature 126, and a contact 127, with which the armature coacts. Contact 127 is connected by a wire 128 with the second terminal of the winding 113, the other terminal of winding 113 being connected to the wire 124 as explained.

The primary caution relay includes a winding 129, a combined switch and armature 130, and a contact 131 with which this coacts. The contact 131 is connected by a wire 132 with the second terminal of the winding 119, it being remembered that the first terminal of the winding 119 is connected with the wire 124. The armatures 126 and 130 are connected by a branch wire 133 with the wire 97, which, as explained, is one of the main battery leads. Thus, if either armature 126 or 130 drops, the winding 113 or the winding 119, as the case may be, will be deenergized.

As will be explained, neither the armature 126 nor the armature 130 is capable of resetting itself, so that the dropping of either armature entails a sustained deenergization of the corresponding winding 113 or 119. This result is secured by passing the exciting current for the windings 125 and 129 through their respective armatures 126 and 130. Thus one terminal of winding 125 is connected to wire 128 by wire 134, and the other end of the winding is connected by wire 135 with a middle contact 136 of the reversing switch 102 above mentioned.

Similarly, one terminal of winding 129 is connected by a wire 137 with wire 132. The other is connected by a wire 138 with another middle contact 139 of the reversing switch 102. A third middle contact 140 is connected with the return wire 99 by the wire 141. The reversing switch 102 controls connections 142 and 143, and a common return connection 144 for two impulse generating coils 145 and 146.

As is clearly shown in Figure 2, the reversing switch 102 consists of a middle row of contacts which may be connected alternately, all with an upper row of contacts or all with the lower row of contacts. There are cross connections between the upper row and lower row, so disposed that the effect of connecting the middle row with the upper row or the lower row is alternately to transpose or interchange the coils 145 and 146 with reference to the windings 125 and 129. This is necessary, because the track equipment at one side of the track is for danger indications, and at the other side is for caution indications. Since the train may be headed in either direction on the track, it is necessary at times to transpose the coils 145 and 146 in order to establish the proper relation between the caution and danger apparatus on the train, and the caution and danger apparatus on the track. Such reversing switches are common in the art and no detailed explanation seems necessary.

It will be assumed from now on that the normal connection is in effect, in which the middle row and lower row of contacts are connected with each other, so that the coil 145 is associated with the relay 125 and the coil 146 is associated with the relay 129. In such case the wire 135 connects directly with the wire 142, wire 138 connects directly with the wire 143, and the common return from the winding 145 and 146 is established through the wires 144 and 141 to the return lead 99.

The coils 145 and 146 are wound on cores having pole pieces 147 and 148 respectively, which are located between the rails and slightly above the tops thereof. The pole pieces and windings are carried by adjustable brackets 149 and 150 of magnetic material, and these brackets are carried by yokes 151 which arch over the wheels 155 and 156 and are supported on the journal boxes 152. The yoke 151 also carries a collar 153 which surrounds the axle 154 freely but so closely as to provide a relatively small air gap between the collar 153 and the axle 154.

Remembering that the axle and the wheels are of magnetic material and that the wheels are fixed on the axle, two distinct magnetic paths are afforded through the cores, brackets, collar, axle and wheels.

The track equipment consists of any means for so passing magnetic lines of force through either of the two magnetic paths above defined as to generate in one or another coil 145 or 146, upon passage of the train, an impulse of such character as will deenergize the relay winding 125 or 129, as the case may be, and cause the corresponding armature 126 or 130 to drop.

It has been explained that the buttons 109 and 110 may be closed to prevent the armature from dropping, provided the arm 103 is in contact with the contacts 104 or 105, as the case may be. This result is secured because the switches 109, 110 establish a connection to the wires 128 and 132 respectively, and thus maintain the energization of the windings 125, 129.

The track equipment consists of two permanent magnets, one for danger indications and the other for caution indications, each having a neutralizing winding which renders the permanent magnet ineffective when the corresponding neutralizing winding is excited.

The track rails are shown at 157 and 158, and a tie is indicated at 159. The bar 160 is fixed to the base of rail 157 and extends inward therefrom. This bar is of magnetic material, and forms an extension of a permanent magnet 161 which has at its opposite end a core extension terminating in a pole piece 162, opposed to the pole piece 147 of the train carried coil 145. The winding 163 on this core may be energized by a battery 164 under the control of a switch 165. This switch is under the control of the danger signal, is closed during clear indications, and open during danger indications.

A substantially identical caution unit is fixed to the base of the rail 158 and includes a bar 166, permanent magnet 167, pole piece 168, (opposed to pole piece 148) winding 169, battery 170, and switch 171. The switch 171 is connected so as to be open during caution indications and closed when the caution signal gives a clear indication. If both the switches 165 and 171 are closed when a train passes, permanent magnets 161 and 167 are inert and no impulse is transmitted to the coils 145 and 146.

Assume that the engineer attempts to pass a danger signal set against him. Switch 165 will be open and winding 163 inert. Consequently, the field of permanent magnet 161 is effective, and as the train passes the magnetic field will be momentarily directed through the winding 145 in which an impulse will be generated which neutralizes the excitation of winding 125 and causes armature 126 to drop. This immediately deenergizes winding 113 of the secondary relay, causing armature 112 to drop. This deenergizes winding 52, lights signal lamp 116 and energizes the wire 95.

The immediate effect is to cause the piston 46 to shift the engineer's brake valve as already described, after which the piston 58 is depressed, winding 77 energized, the valve 75 closed, and the reduction limiting mechanism rendered effective. When the desired reduction has been made, the diaphragm 78 operates to establish connection through contact 88, the time switch is closed, the reduction terminating valve closes, and the first step of the split reduction is completed.

The engineer can prevent a second reduction by closing the switch 62, but if he does not the device will automatically go through a second and other succeeding reductions until the brake pipe pressure is reduced to atmospheric, or until the electrical mechanism is restored by the reset button 109.

It will be observed that if the speed of the train had been below the danger limit the engineer might have passed the signal without causing any application of the brakes, provided he pressed the reset button 109 while passing the signal set against him. If his speed was above the danger limit the reset button 109 would be ineffective, and the brakes could not be released until the speed had been reduced to the danger limit. By locating the reset button 109 so that it is inaccessible from the cab, the engineer may be made to come to a full stop before resetting his release after passing a danger signal.

A similar series of events occurs if the engineer passes a caution signal set against him. Here he may prevent an application of the brakes if he acknowledges the signal by pressing the reset button 110 while passing the signal, but here again the reset button is ineffective if the speed of the train is above the caution limit, for under such circumstances the arm 103 would be beyond the end of the contact 105. The engineer may under any circumstances prevent a second reduction of brake pipe pressure by closing the switch 62, and he may restore the relays by pressing the button 110 whenever the train speed is below the caution limit. He may then shift the brake valve manually to release position.

If the train speed exceeds the maximum limit the arm 103 will overtravel the contact 106. This interrupts the circuit through the winding 52 and causes the brake valve motor to act and shift the engineer's brake valve to service position. It does not, however, affect the relays. Accordingly, the wire 95 is not energized and the apparatus for producing the split reduction is not put into action. Instead a full service reduction occurs. Release of the resulting application cannot be had until the train speed is reduced below the fixed limit, at which time it becomes once more possible to shift the brake valve to release position and then after release to running position.

What is claimed is:

1. The combination of an engineer's brake valve; a control device operable to shift said valve to an application position; and means rendered active by said control device in so shifting said valve, and serving when active to interrupt periodically the brake applying flow through said valve, while the brake valve remains in application position.

2. The combination of an engineer's brake valve of the equalizing discharge type including an equalizing discharge valve; a control device operable to shift said brake valve to an application position; and means rendered active by said control device in so shifting said brake valve and serving when active to close the equalizing discharge valve periodically, while the brake valve remains in application position.

3. The combination of an engineer's brake valve of the equalizing discharge type, including an equalizing discharge valve, piston and preliminary exhaust port; a control device operable to shift said brake valve to an application position in which said preliminary exhaust port is open; an independent valve controlling said preliminary exhaust port; and means rendered active by said control device in so shifting said brake valve, and serving when active to close said independent valve periodically while the brake valve remains in application position.

4. The combination of an engineer's brake valve of the equalizing discharge type including an equalizing discharge valve, piston and preliminary exhaust port; a control device operable to shift said brake valve to an application position in which said preliminary exhaust port is open; an independent valve controlling said preliminary exhaust port; an equalizing reservoir; and means responsive to the reduction of pressure in said equalizing reservoir and rendered active by the action of said control device in shifting said brake valve, and serving when active to close and open said independent valve periodically.

5. The combination of an engineer's brake valve of the equalizing discharge type including an equalizing discharge valve, piston and preliminary exhaust port; a motor operable to shift said brake valve to an application position in which said preliminary exhaust port is open; an electro-magnet winding normally excited and when excited holding said motor inactive; a normally open independent valve controlling said preliminary exhaust port; an electro-magnet winding for operating said independent valve; and a control device operable to deenergize the first named winding and while this is deenergized to energize and deenergize alternately the second-named winding.

6. The combination of an engineer's brake valve of the equalizing discharge type including an equalizing discharge valve, piston and preliminary exhaust port; a pressure motor operable to shift said brake valve to an application position in which said preliminary exhaust port is open; an electro-magnetically actuated valve normally excited to hold said motor out of action; a normally open electro-magnetically actuated valve controlling said preliminary exhaust port; and a control device operable to deenergize the actuating means of the first electro-magnetically actuated valve, and while this is deenergized to energize and deenergize periodically the actuating means of the second electro-magnetically actuated valve.

7. The combination of an engineer's brake valve of the equalizing discharge type including an equalizing discharge valve, piston and preliminary exhaust port; a control device operable to shift said brake valve to an application position in which said preliminary exhaust port is open; an independent valve controlling said preliminary exhaust port; an equalizing reservoir; and a device rendered active by the action of said control device, and including means responsive to a given reduction of pressure in said reservoir for closing said independent valve, and a device responsive to the resulting cessation of flow through the equalizing discharge valve and serving to reopen said independent valve.

8. The combination of an engineer's brake valve of the equalizing discharge type including an equalizing discharge valve, piston and preliminary exhaust port; a motor operable to shift said brake valve to an application position in which said preliminary exhaust port is open; an electromagnet winding normally excited and when excited holding said motor inactive; a normally open independent valve controlling said preliminary exhaust port; an electromagnet winding for operating said independent valve; an equalizing reservoir; a control device operable to deenergize the first named winding and simultaneously establish a supply of current for the second named winding; a pressure actuated switch subject to the pressure in the equalizing reservoir and arranged to close upon a given reduction of pressure to connect said current supply in exciting relation with the second winding; and a second switch subject to the pressure of air discharging through the equalizing discharge valve, normally open unless held closed thereby, said switch when open interrupting the exciting circuit for the second named winding, and setting the first named switch in circuit opening position.

9. The combination of an engineer's brake valve of the equalizing discharge type including an equalizing discharge valve, piston and preliminary exhaust port; a motor operable to shift said brake valve to an application position in which said preliminary exhaust port is open; a normally open electro-magnetically actuated reduction terminating valve controlling said preliminary exhaust port; a pressure actuated switch arranged to be closed by air discharged by said equalizing discharge valve; an equalizing reservoir comprising two chambers normally in communication with each other; an electro-magnetically actuated isolating valve controlling the communication between said chambers; a reduction limiting switch; a diaphragm subject to the opposing pressures in said two chambers and connected to actuate said reduction limiting switch; a delayed action relay switch; electrical connections whereby the pressure actuated switch controls the isolating valve, the reduction limiting switch controls the relay switch and the relay switch controls reduction terminating valve; and a control device operable to actuate said motor and simultaneously supply electric energy to said connections.

10. The combination of an engineer's brake valve; a control device operable to shift said valve to an application position; means rendered active by said control device in so shifting said valve and serving when active to interrupt periodically the brake applying flow through said valve, while the brake valve remains in application position; and manually operable means for preventing the recurrence of brake applying flow after automatic interruption thereof.

11. The combination of an engineer's brake valve of the equalizing discharge type including an equalizing discharge valve; a control device operable to shift said brake valve to an application position; means rendered active by said control device in so shifting said brake valve and serving when active to close the equalizing discharge valve periodically, while the brake valve remains in application position; and manually operable means for preventing the equalizing discharge valve from reopening after closing.

12. The combination of an engineer's brake valve of the equalizing discharge type, including an equalizing discharge valve, piston and preliminary exhaust port; a control device operable to shift said brake valve to an application position in which said preliminary exhaust port is open; an independent valve controlling said preliminary exhaust port; means rendered active by said control device in so shifting said brake valve, and serving when active to close said independent valve periodically while the brake valve remains in application position; and manually operable means for preventing the reopening of said independent valve after any periodic closure thereof.

In testimony whereof we have signed our names to this specification.

CHARLES A. CAMPBELL.
ERWIN C. VROMAN.